United States Patent
Yuichi et al.

(10) Patent No.: US 9,547,198 B2
(45) Date of Patent: Jan. 17, 2017

(54) LIQUID CRYSTAL HORIZONTAL ORIENTATION AGENT, HORIZONTAL ORIENTATION TYPE LIQUID CRYSTAL COMPOSITION, AND HORIZONTAL ORIENTATION TYPE LIQUID CRYSTAL DISPLAY DEVICE AND METHOD OF FABRICATING THE SAME

(71) Applicants: LG DISPLAY CO., LTD., Seoul (KR); YAMAGATA UNIVERSITY, Yamagata-Shi (JP)

(72) Inventors: Momoi Yuichi, Tokyo (JP); Mu-Sun Kwak, Goyang-Si (KR); Koda Tomonori, Yonezawa (JP); Yonetake Koichiro, Yonezawa (JP); Haba Osamu, Yonezawa (JP)

(73) Assignees: LG DISPLAY CO., LTD., Seoul (KR); YAMAGATA UNIVERSITY, Yamagata-Shi (JP)

(*) Notice: Subject to any disclaimer, the term of this patent is extended or adjusted under 35 U.S.C. 154(b) by 39 days.

(21) Appl. No.: 14/492,676

(22) Filed: Sep. 22, 2014

(65) Prior Publication Data
US 2015/0085241 A1    Mar. 26, 2015

(30) Foreign Application Priority Data

Sep. 25, 2013    (JP) ................ 2013-197897

(51) Int. Cl.
| C09K 19/00 | (2006.01) |
| G02F 1/1337 | (2006.01) |
| C09K 19/56 | (2006.01) |
| C08G 83/00 | (2006.01) |
| C09K 19/04 | (2006.01) |

(52) U.S. Cl.
CPC ....... *G02F 1/133788* (2013.01); *C08G 83/003* (2013.01); *C09K 19/56* (2013.01); *C09K 2019/0418* (2013.01); *Y10T 428/10* (2015.01); *Y10T 428/1005* (2015.01)

(58) Field of Classification Search
CPC ............. G02F 1/133711; G02F 1/133788; G02F 1/134363; G02F 2001/133738; C09K 19/56; C09K 19/02; C09K 2019/546; C09K 2019/548; C09K 2019/0418; Y10T 428/10; Y10T 428/1005
USPC ........... 428/1.1, 1.2; 349/88, 132, 163, 191; 252/299.4, 299.5; 528/205
See application file for complete search history.

(56) References Cited

U.S. PATENT DOCUMENTS

2012/0307184 A1    12/2012    Kizaki et al.

FOREIGN PATENT DOCUMENTS

| JP | 2005-247921 A | 9/2005 |
| JP | 2006-18106 A | 1/2006 |
| JP | 2008-51846 A | 3/2008 |
| JP | 2010-170090 A | 8/2010 |
| JP | 2010170090 A * | 8/2010 |

(Continued)

*Primary Examiner* — Ruiyun Zhang
(74) *Attorney, Agent, or Firm* — Birch, Stewart, Kolasch & Birch, LLP

(57) ABSTRACT

The present invention provides a liquid crystal horizontal orientation agent, a horizontal orientation type liquid crystal composition, a horizontal orientation type LCD device and a method of fabricating the horizontal orientation type LCD device. In one embodiment, the liquid crystal molecule is horizontally oriented by the liquid crystal horizontal orientation agent without the rubbed orientation layer.

6 Claims, 1 Drawing Sheet

(56) References Cited

FOREIGN PATENT DOCUMENTS

| JP | 2012-78617 A | 4/2012 |
|---|---|---|
| JP | 2012-113132 A | 6/2012 |
| JP | 2012-118212 A | 6/2012 |
| JP | 2012-118330 A | 6/2012 |

\* cited by examiner

LIQUID CRYSTAL HORIZONTAL ORIENTATION AGENT, HORIZONTAL ORIENTATION TYPE LIQUID CRYSTAL COMPOSITION, AND HORIZONTAL ORIENTATION TYPE LIQUID CRYSTAL DISPLAY DEVICE AND METHOD OF FABRICATING THE SAME

The present application claims the benefit of Japanese Patent Application No. 2013-197897 filed in Japan on Sep. 25, 2013, which is herein incorporated by reference.

BACKGROUND

Technical Field

The present invention relates to a liquid crystal display (LCD) device, and more particularly, to a liquid crystal horizontal orientation agent, a horizontal orientation type liquid crystal composition, and a horizontal orientation type LCD device and a method of fabricating the same.

Related Art

Since the LCD device has characteristics of low driving voltage, low power consumption, light weight, and so on, the LCD device is widely used for a display device of watches, mobile phones, computers, televisions, and so on. The LCD device is driven in a twisted nematic (TN) mode, a vertical alignment (VA) mode and an in-plane switching (IPS) mode. Properties, e.g., a refractive index, a dielectric constant, viscosity or a phase transition temperature, of the liquid crystal material are changed according to the driving mode of the LCD device. To meet the properties, the liquid crystal material includes at least two compounds. Recently, the liquid crystal material including fine particles to improve properties of the liquid crystal material is introduced. See, for example, Japanese Patent Publication No.: 2005-247921, published on May 15, 2009.

The LCD device requires an element controlling the direction of the liquid crystal molecule. Generally, an orientation layer is formed to control the direction of the liquid crystal molecule. For example, in the TN and IPS mode of the LCD device, the direction of the liquid crystal molecule is controlled in a horizontal direction with respect to a substrate by the rubbed orientation layer. On the other hand, in the VA mode of the LCD device, which does not require a rubbing process, the liquid crystal molecule is controlled in a vertical direction with respect to the substrate by the orientation layer. The term of "orientation layer" means a layer controlling an arrangement state of the liquid crystal molecule. Generally, the orientation layer is formed of a resin such as polyimide. The term of "rubbing process" means a process of rubbing the surface of the orientation layer along one direction by rotating a roller, on which clothes, e.g., rayon or cotton, with a pre-determined number of rotation and maintaining a pre-determined distance between the roller and the substrate.

However, there are various problems resulting from the forming process of the orientation layer and the rubbing process in the arrangement control of the liquid crystal molecule using the orientation layer. For example, in the forming process of the orientation layer or the rubbing process, dusts or pin-holes are generated such that the production yield is decreased or the production costs. Such problems in the large glass substrate are increased.

To control the arrangement of the liquid crystal molecule without the orientation layer, the liquid crystal composition including dendrimer as a liquid crystal orientation agent is introduced. See, for example, Japanese Patent Publication No.: 2010-170090, published Aug. 5, 2010. Since the liquid crystal molecule is oriented in a vertical direction with respect to the substrate by the liquid crystal orientation agent introduced in the above Japanese Patent Publication, the liquid crystal orientation agent is used for the VA mode LCD device.

SUMMARY

Accordingly, the present invention is directed to a liquid crystal horizontal orientation agent, a horizontal orientation type liquid crystal composition, and a horizontal orientation type LCD device and a method of fabricating the same that substantially obviate one or more of the problems due to limitations and disadvantages of the related art.

An object of the present invention is to provide a liquid crystal horizontal orientation agent being capable of horizontally arranging liquid crystal molecules without an orientation layer.

Another object of the present invention is to provide a horizontal orientation type liquid crystal composition including a liquid crystal horizontal orientation agent.

Another object of the present invention is to provide a horizontal orientation type LCD device including a horizontal orientation type liquid crystal composition.

Another object of the present invention is to provide a method of fabricating a horizontal orientation type LCD device.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

In accordance with the present invention, as embodied and broadly described herein, the present invention provides a liquid crystal horizontal orientation agent including a core; and a dendrimer including a dendron part linked with the core.

In another aspect, the present invention provides a horizontal orientation type liquid crystal composition including a liquid crystal component; and a liquid crystal horizontal orientation agent including: a core; and a dendrimer including a dendron part linked with the core.

In another aspect, the present invention provides a horizontal orientation type liquid crystal display device including a first substrate including comb-shaped electrodes; a second substrate facing the first substrate; and a liquid crystal layer including a liquid crystal component and a liquid crystal horizontal orientation agent, the liquid crystal horizontal orientation agent including a core; and a dendrimer including a dendron part linked with the core, wherein a polarized UV ray is irradiated to the liquid crystal layer such that a liquid crystal molecule in the liquid crystal layer is horizontally oriented with respect to the first and second substrates.

In another aspect, the present invention provides a method of fabricating a horizontal orientation type liquid crystal display device including forming comb-shaped electrodes on a first substrate; attaching a second substrate with the first substrate; forming a liquid crystal layer including a liquid crystal component and a liquid crystal horizontal orientation agent, the liquid crystal horizontal orientation agent including a core; and a dendrimer including a dendron part linked with the core; and irradiating a polarized UV ray to the liquid crystal layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
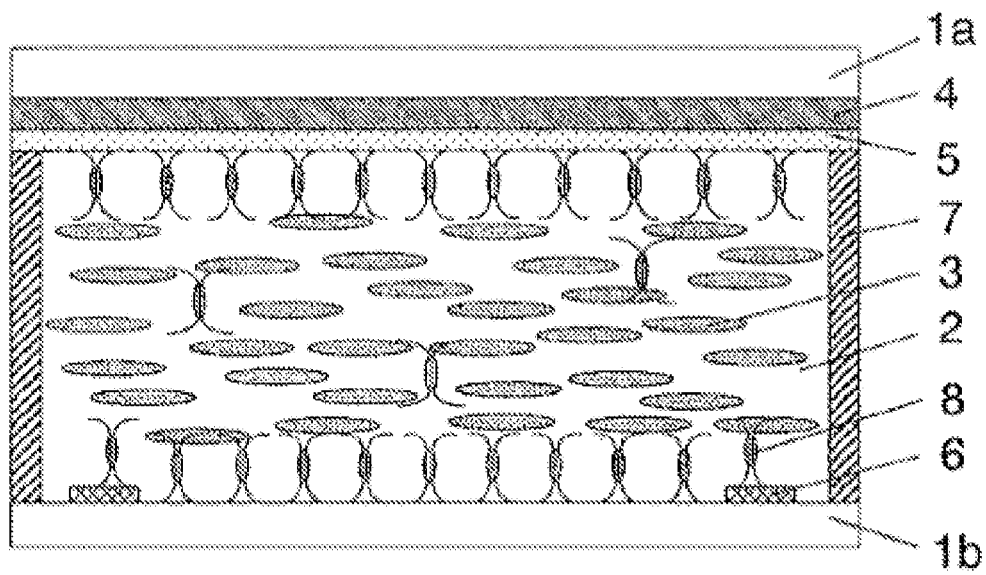
FIG. 1 is a schematic cross-sectional view of an IPS mode LCD device according to an embodiment of the present invention.

Reference will now be made in detail to the preferred embodiments, examples of which are illustrated in the accompanying drawings.

First Embodiment

A liquid crystal horizontal orientation agent comprises a dendrimer including a core and a dendron part linked with the core. The term of "core" preferably means a center part of the dendrimer. The term of "dendron part" preferably means a side chain part regularly branched from the core. The term of "liquid crystal horizontal orientation agent" preferably means an additive being capable of controlling the orientation of the liquid crystal molecule in a horizontal direction with respect to a substrate without an orientation layer. The liquid crystal horizontal orientation agent is mixed to the liquid crystal component used for a liquid crystal layer in the conventional horizontally orientation type LCD device. The term of "horizontally orientation type LCD device" preferably means an LCD device, where the liquid crystal molecule is oriented and controlled in a horizontal direction with respect to the substrate, e.g., an IPS mode LCD device.

The dendrimer used for the liquid crystal horizontal orientation agent (hereinafter, "horizontal orientation agent") has an azo-group (—N=N—) in the dendron part.

Since the liquid crystal molecule in the liquid crystal layer is uniaxially orientated in a horizontal direction with respect to the substrate by irradiating a polarized UV ray to the dendrimer, the dendrimer can be used as the horizontal orientation agent. On the other hand, since the liquid crystal molecule in the liquid crystal layer is uniaxially orientated in a vertical direction with respect to the substrate by the dendrimer without the polarized UV ray, the dendrimer can be used as the vertical orientation agent. The change of the orientation direction of the liquid crystal molecule with or without the polarized UV ray may be resulted from the structural change of the dendron part according to cis-trans photoisomerization. Namely, the dendron part of the dendrimer is changed from a linear shape into a curved shape by the polarized UV ray such that the liquid crystal molecule in the liquid crystal layer can be uniaxially orientated in a horizontal direction with respect to the substrate.

Since the orientation direction of the liquid crystal molecule is controlled with or without the polarized UV ray to the horizontal orientation agent of the present invention, the change or cleaning of the material is not required in comparison to the related art method. In addition, the LCD devices having different orientation modes are easily and quickly fabricated.

It is preferred that the dendrimer used as the horizontal orientation agent is compatible to the liquid crystal component. Without the compatibility to the liquid crystal component, the dendrimer may be precipitated such that uniform orientation control characteristic (horizontal orientation) is not provided. The term of "compatibility to the liquid crystal component" preferably means that when the mixture of the liquid crystal component and the dendrimer has an isotropic state by heating the mixture in an oven beyond the phase-transition temperature of the liquid crystal component, the dendrimer is dissolved (namely, the liquid crystal composition including the liquid crystal component and the dendrimer is transparent) and the precipitation of the dendrimer is not generated in a room temperature (25° C.).

It is preferred that the dendrimer used as the horizontal orientation agent includes at least one dendron part, which is selected from a group consisting of alkyl, alkoxy and fluorine, at an end of the dendrimer. The reason is that the dendrimer has a good compatibility with a liquid crystal mixture, which includes two or more liquid crystal components, as well as a single-component cyano liquid crystal. Particularly, the liquid crystal mixture, which is generally used for the practical LCD device, is designed for impurities to be difficult to dissolve in order to secure the reliability of the LCD device, additives are scarcely dissolved. However, the dendrimer has a good compatibility to the liquid crystal mixture.

The core of the dendrimer, which is used as the horizontal orientation agent, has following formula 1.

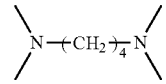

[Formula 1]

The dendron part of the dendrimer, which is used as the horizontal orientation agent, has following formula 2.

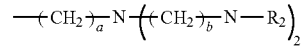

[Formula 2]

In the formula 2, each of "a" and "b" is an integer of 2 to 5, beneficially 2 to 4, and more beneficially 3. In the formula 2, "R" is represented by following formula 3.

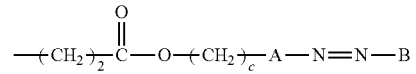

[Formula 3]

In the formula 3, "c" is an integer of 3 to 12, beneficially 4 to 10, and more beneficially 5 to 8. In the formula 3, "A" is one of following formulas.

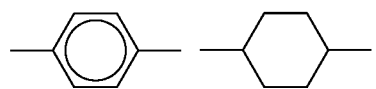

In the formula 3, "B" is one of following formulas.

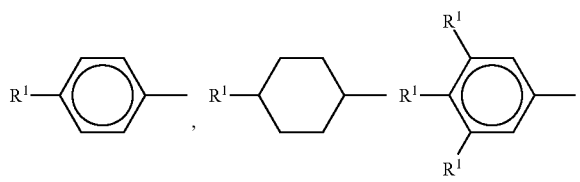

In the above formulas, "R1" is C1 to C12 alkyl, C1 to C12 alkoxy or fluorine, beneficially C2 to C10 alkyl, C2 to C10 alkoxy or fluorine, and more beneficially C3 to C8 alkyl, C3 to C8 alkoxy or fluorine.

The dendrimer, which is used as the horizontal orientation agent, can be synthesized by the common method disclosed in various documents. A compound for the core and a compound linked to the core to form the dendron part are reacted in an organic solvent. In addition, to control a generation of the dendrimer, a branch side portion of the dendron part may be already formed to the compound for the core.

For example, the dendrimer, which is used as the horizontal orientation agent, may be synthesized by reacting a multi-functional amine compound and an acrylic ester derivative in an organic solvent.

For example, the multi-functional amine compound may be one of polypropylene tetramine dendrimer generation 1.0 and polypropylene octaamine dendrimer generation 2.0. DAB-Am-4 or DAB-Am-8, which are products of Aldrich Co. Ltd, may be used for the multi-functional amine compound. The multi-functional amine compound may be synthesized from ethylenediamine and acrylonitrile as starting materials.

The acrylic ester derivative is selected depending on the dendrimer. For example, for the dendrimer comprising the core in the above formula 1 and the dendron part in the above formula 2, the acrylic ester derivative in following formula 4 can be used.

[Formula 4]

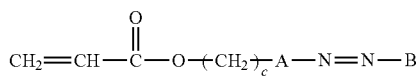

In the formula 4, "A", "B" and "c" meet the above definitions, respectively.

The reaction ratio of the multi-functional amine compound to the acrylic ester derivative is not limited. For example, 1.0 to 3.0 mole acrylic ester derivative is used with respect to 1 mol multi-functional amine compound. Beneficially 1.1 to 1.5 mol acrylic ester derivative is used with respect to 1 mol multi-functional amine compound.

The material for the organic solvent is not limited. For example, halogenated hydrocarbon solvents, e.g., 1,2-dichloroethane and chloroform, ketone solvents, e.g., acetone, methylethylketone, methyl isobuthyl ketone and cyclohexanone, cyclic-ester solvents, e.g., tetrahydrofuran and dioxane, aromatic hydrocarbon solvents, e.g., toluene and xylene, or aprotic polar solvent, e.g., N-methyl-2-pyrolidone, N,N-dimethylformamide and N,N-dimethylacetamide, may be used. The organic solvents may be used singly or in mixture of two or more.

Amount of the organic solvent is selected depending on amount of the multi-functional amine compound or amount of the acrylic ester derivative.

The reaction temperature is not limited. For example, the reaction temperature may be −50 to 150° C., and more beneficially 25 to 80° C. When the reaction temperature is below −50° C., the reaction rate may be remarkably lowered. When the reaction temperature is above 150° C., the stability of the multi-functional amine compound or amount of the acrylic ester derivative may be decreased.

The reaction time is not limited. For example, the reaction time may be 2 to 200 hours, and more beneficially 48 to 100 hours. When the reaction time is below 2 hours, the reaction may be insufficient. When the reaction time is above 200 hours, it is not practical because of too long reaction time.

After completion of the reaction, the solvents are removed to obtain the dendrimer product. In addition, a refinement process may be further performed by adding poor solvent, e.g., methanol, ethanol, isopropyl alcohol, hexane and toluene, heating and removing an upper clear part.

Second Embodiment

A horizontal orientation liquid crystal composition of the present invention (hereinafter, "liquid crystal composition") comprises a liquid crystal component and the horizontal orientation agent.

In the liquid crystal composition used for the liquid crystal layer, cis-trans photoisomerization of the horizontal orientation agent is generated by irradiating the UV ray. As a result, the liquid crystal molecule is oriented along a horizontal direction with respect to the substrate.

The horizontal orientation agent, i.e., dendrimer, is positioned at an interface between the liquid crystal layer and each of two substrates, by which the liquid crystal layer is sandwiched, such that the same effect as the rubbed orientation layer is generated in the liquid crystal layer by the horizontal orientation agent. As a result, the liquid crystal molecule in the liquid crystal layer is oriented along the horizontal direction with respect to the substrate. Amount of the horizontal orientation agent in the liquid crystal composition is controlled such that the horizontal orientation agent is positioned at the interface. The amount of the horizontal orientation agent depends on a surface area of the substrate. For example, the amount of the horizontal orientation agent with respect to the liquid crystal composition has a range of 0.01 to 50 weight %. When the amount of the horizontal orientation agent is below 0.01 weight %, the reliability of the orientation of the liquid crystal molecule is not secured. When the amount of the horizontal orientation agent is above 50 weight %, the amount of the liquid crystal component is too small such that the response time and the driving voltage are increased.

The method of mixing the horizontal orientation agent with the liquid crystal component is not limited. For example, the horizontal orientation agent is added to the liquid crystal component, and the horizontal orientation agent and the liquid crystal component are mixed by using common mixing units.

The liquid crystal component for the liquid crystal composition is not limited. The liquid crystal component may be a liquid crystal mixture including two or more liquid crystals. The liquid crystal mixture may include several liquid crystals to meet desired properties, e.g., a refractive index, a dielectric constant, viscosity or a phase transition temperature. For example, fluorine liquid crystal mixture or cyano liquid crystal mixture may be used. Beneficially, the fluorine liquid crystal mixture, which is widely used for the LCD device, may be used. The term of "fluorine liquid crystal mixture" preferably means a liquid crystal mixture including at least one fluorine liquid crystal, and the term of "cyano liquid crystal mixture" preferably means a liquid crystal mixture including at least one cyano liquid crystal.

For example, the liquid crystal composition has a liquid crystal property in a room temperature and a phase transition temperature of 50 to 120° C. from a liquid crystal phase to an isotropic phase or other phases.

When the liquid crystal composition is used for the liquid crystal layer of the LCD device, the horizontal orientation agent is positioned at an interface between the liquid crystal layer and an element, which is adjacent to the liquid crystal layer, the same effect as the rubbed orientation layer is generated in the liquid crystal layer by the horizontal orientation agent. Namely, the horizontal orientation effect of the liquid crystal molecule is generated. As a result, the LCD device using the liquid crystal composition does not require the rubbed orientation layer.

Third Embodiment

A horizontal orientation type LCD device (hereinafter "LCD device" with respect to this embodiment) includes the liquid crystal composition for the liquid crystal layer. In the LCD device, the liquid crystal composition is formed between two substrates, and a polarized UV ray is irradiated to the liquid crystal composition. The explanation of the liquid crystal composition is omitted.

The LCD device of the present invention will be explained with an example of an IPS mode LCD device. The LCD device of the present invention can include other elements of common LCD devices. The LCD device including the liquid crystal composition does not require the rubbed orientation layer. However, the LCD device may further include the rubbed orientation layer. In this instance, the orientation of the liquid crystal molecule is also controlled without decrease of properties such as contrast ratio.

FIG. 1 is a schematic cross-sectional view of an IPS mode LCD device according to an embodiment of the present invention. The LCD device as shown includes first and second substrates 1a and 1b and a liquid crystal layer 2 between the first and second substrates 1a and 1b. For example, each of the first and second substrates 1a and 1b may be the glass substrate. On the first substrate 1a, a color filter layer 4 and an overcoat layer 5 protecting the color filter layer 4 are sequentially formed. On the second substrate 1b, comb-shaped electrodes 6 are formed. The liquid crystal layer 2 is directly adjacent to the comb-shaped electrodes 6 and is sealed by a seal pattern 7. Instead of the comb-shaped electrodes 6, a fringe field switching (FFS) mode electrodes can be used. See, for example, Japanese Patent Publication No. 2008-51846, published Mar. 6, 2018. Most of the horizontal orientation agent 8 in the liquid crystal layer 2 are positioned at the interface between the liquid crystal layer 2 and an element, i.e., the comb-shaped electrodes 6, being adjacent to the liquid crystal layer 2 such that the same effect as the rubbed orientation layer is generated in the liquid crystal layer. As a result, the liquid crystal molecule 3 in the liquid crystal layer 2 is oriented along the horizontal direction with respect to the substrate 1b. In the IPS mode LCD device, a horizontal electric field is generated by the comb-shaped electrodes 6, the liquid crystal molecule 3 is rotated in a plane being parallel to the first and second substrates 1a and 1b.

The IPS mode LCD device can be fabricated as follows.

First, the liquid crystal composition is provided as the liquid crystal layer 2 between the first substrate 1a, on which the color filter layer 4 and the overcoat layer 5 are formed, and the second substrate 1b, on which the comb-shaped electrodes 6 are formed, and is sealed by the seal pattern 7.

The method of providing the liquid crystal composition is not limited. For example, one drop filling (ODF) method or a method using capillary phenomenon may be used.

Figure 2:
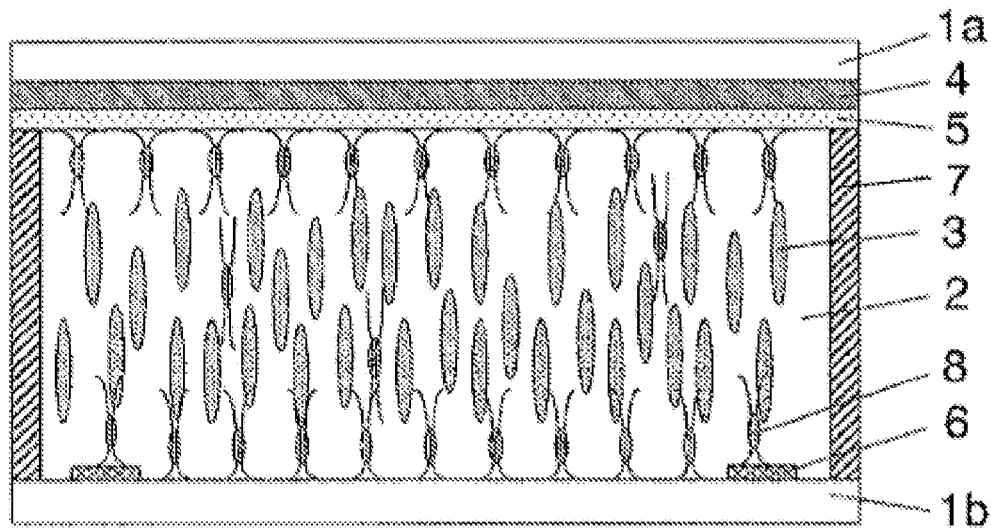
FIG. 2 is a schematic cross-sectional view of an IPS mode LCD device before irradiating a polarized UV ray according to an embodiment of the present invention.

In the liquid crystal layer 2, as shown in FIG. 2, most of the horizontal orientation agent 8 are positioned at the interface between the liquid crystal layer 2 and the elements, e.g., the overcoat layer 5, the second substrate 1b and the comb-shaped electrodes 6, being adjacent to the liquid crystal layer 2, such that the liquid crystal molecule 3 of the liquid crystal layer 2 is oriented to be perpendicular to the substrate.

Next, the polarized UV ray is irradiated to the liquid crystal composition between the first and second substrates 1a and 1b.

An irradiating method of the polarized UV ray is not limited. For example, a high pressure mercury lamp or a metal halide lamp may be used. A method of providing the polarized UV light is not limited. For example, a non-polarized UV ray may be irradiated to be inclined with respect to a surface of the substrate or from a diagonal direction with respect to a surface of the substrate to provide the polarized UV ray. See, for example, Japanese Patent Publication No. 2006-18106, published Jan. 19, 2006. A method using a Glan-Tayler prism, a method using a polarization film or a method using Brewster's angle of quartz-glass may be used.

The wavelength of the polarized UV ray is not limited within a range being capable of generating cis-trans photoisomerization of the dendrimer. For example, the wavelength of the polarized UV ray may be 200 to 380 nm, and more beneficially 300 to 380 nm.

A peak intensity of the polarized UV ray is controlled depending on a size of the LCD device. For example, the peak intensity of the polarized UV may have a range of 100 to 500 mW/cm2, beneficially 500 to 2000 mW/cm2, and more beneficially 1000 to 1500 mW/cm2.

With the polarized UV ray irradiation, the structural change according to cis-trans photoisomerization is generated in the horizontal orientation agent 8 of the liquid crystal layer 2. As a result, as shown in FIG. 1, the liquid crystal molecule 3 of the liquid crystal layer 2 is oriented along a horizontal direction with respect to the substrate.

In the IPS mode LCD device of the present invention, the liquid crystal layer 2 can include the horizontal orientation agent 8, and most of the horizontal orientation agent 8 is positioned at the interface between the liquid crystal layer 2 and adjacent elements to the liquid crystal layer 2. As a result, the orientation of the liquid crystal molecule 3 is controlled by the horizontal orientation agent 8. Namely, the horizontal orientation agent 8 is positioned at an upper surface and a lower surface of the liquid crystal layer 2 such that the same effect as the rubbed orientation layer is generated in the liquid crystal layer by the horizontal orientation agent. Accordingly, being different from the related art IPS mode LCD device, the orientation of liquid crystal molecule 3 in the IPS mode LCD device of the present invention can be controlled without the rubbed orientation layer. In addition, without the rubbed orientation layer, the liquid crystal layer 2 is positioned in directly contact with the comb-shaped electrodes 6, power loss is decreased such that the driving voltage of the LCD device is reduced.

In the related art IPS mode LCD device, i) a coating process polyimide (PI) on the substrate, ii) a pre-baking process, iii) a post-baking process, iv) a rubbing process and v) a cleaning process are required. The rubbing process and the cleaning process can be omitted depending on a driving type of the LCD device.

On the other hand, since the liquid crystal molecule is oriented by a process of adding the horizontal orientation agent and a process of irradiating the polarized UV ray, the process of forming the orientation layer and the process of rubbing the orientation layer are not required. Namely, since the fabricating method of the LCD device of the present invention does not require the above i) to v) processes, the fabricating process is simplified and the production costs is reduced. In addition, since the problems of dusts or pin-holes generated in the process of forming and rubbing the orientation layer is not generated, the production yield is increased.

<Dendrimer A Synthesis>

The dendrimer, where R in the formula 2 is following formula 5, is synthesized by following.

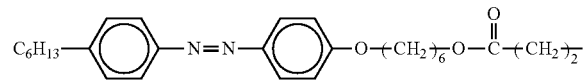

[Formula 5]

synthesis of
6-[4-(4-hexylphenyldiazenyl)phenoxy]hexanol 4-(4-hexylphenyldiazenyl)phenol (5.0 g, 17.7 mmol), 6-bromohexanol (4.9 g, 18 mmol), potassium carbonate (2.45 g, 17.7 mmol) and ethanol (20 ml) were put into and were dissolved in 200 ml three-neck round flask. The solution was heated and refluxed for 48 hours. After completion of heating and refluxing, ethanol was removed under a reduced pressure to obtain residue. The residue was dissolved in diethylether, and the solution was washed three times by water. Anhydrous sodium sulfate was added in the solution to remove moisture, and the resultant was distilled under a reduced pressure to remove diethylether and obtain residue. The residue was re-crystallized using n-hexane such that the compound of orange-colored spicule crystal was obtained. (3.9 g, yield: 58%) The absorption properties in 3289 cm$^{-1}$ (OH), 2919 cm$^{-1}$ (C—H), 1473 cm$^{-1}$ (N═N) and 1253 cm$^{-1}$ (PhO—) are measured by IR.

synthesis of
6-[4-(4-hexylphenyldiazenyl)phenoxy]hexylacrylate

6-[4-(4-hexylphenyldiazenyl)phenoxy]hexanol (3.5 g, 9.2 mmol), triethylamine (0.92 g, 9.2 mmol) and tetrahydrofuran (THF) (30 ml) were put into and dissolved in 100 ml three-neck round flask. The solution was cooled into 0° C. by ice. Acryloyl chloride (1.2 g, 14 mmol) was added into the solution using a syringe and was stirred at a room temperature for 24 hours. The obtained white solids were filtered, and the filtered solution was concentrated under a reduced pressure. The obtained residue was refined by a column chromatography with silica-gel and chloroform such that yellow solid compound was obtained. (3.4 g, yield: 85%) The absorption properties in 2935 cm$^{-1}$ (C—H), 1716 cm$^{-1}$ (C═O), 1473 cm$^{-1}$ (N═N) and 1261 cm$^{-1}$ (PhO—) are measured by IR. The elementary analysis of the yellow solid compound is $C_{27}H_{36}N_2O_3$. It is almost equal to simulation result. (margin of error: 5%, simulation result—C: 74.28%, H:8.31%, N:6.42%, analysis result—C:74.48%, H:8.61%, N:6.35%)

<Synthesis of Dendrimer A>

DAB-Am-8 (0.39 g, 0.51 mmol), 6-[4-(4-hexylphenyldiazenyl)phenoxy]hexylacrylate (4.9 g, 11 mmol) and THF (20 ml) were put into 100 ml branch-flask and were heated at 50° C. for 72 hours. After the solution was concentrated under a reduced pressure, the residue was dissolved in some quantity THF and was added to hexane (40 ml). An upper clear portion was removed by decantation, and the precipitate material was obtained. The resultant was refined by repeating twice the above processes such that orange-color solid compound was obtained. (3.9 g, yield: 98%) The absorption properties in 2931 cm$^{-1}$ (C—H), 1735 cm$^{-1}$ (C═O), 1457 cm$^{-1}$ (N═N) and 1253 cm$^{-1}$ (PhO—) are measured by IR. The elementary analysis of the orange-color solid compound is $C_{472}H_{672}N_{46}O_{48}$. It is almost equal to simulation result. (margin of error: 5%, simulation result—C:73.07%, H:8.73%, N:8.30%, analysis result—C: 72.86%, H:8.49%, N:8.40%) In the DSC results of the orange-color solid compound, during heat-rising, the glass temperature (Tg) is observed at −13° C., and the endothermic peaks are observed at 33° C. and 83° C. During heat-falling, the exothermic peaks are observed at 81° C. and 28° C., and Tg is observed at −29° C.

<Dendrimer B Synthesis>

The dendrimer, where R in the formula 2 is following formula 6, is synthesized by following.

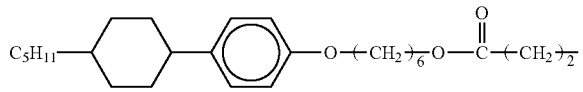

[Formula 6]

synthesis of
6-[4-(trans-4-pentylcyclohexyl)phenoxy]hexanol 4-(trans-4-pentylcyclohexyl)phenoxyphenol (10 g, 41 mmol), 6-bromohexanol (8.8 g, 49 mmol), potassium carbonate (11 g, 80 mmol) and 2-buthanone (50 ml) were put into 200 ml branch-flask and were heated and refluxed for 60 hours. After completion of heating and refluxing, 2-buthanone was removed under a reduced pressure to obtain residue. The residue was dissolved in ethylacetate, and the solution was washed three times by water. Anhydrous sodium sulfate was added in the solution to remove moisture, and the resultant was distilled under a reduced pressure to remove ethylacetate and obtain residue. The residue was re-crystallized using n-hexane such that the white solid compound was obtained. (6.2 g, yield: 44%) The absorption properties in 3340 cm$^{-1}$ (OH), 2922 cm$^{-1}$ (C—H) and 1245 cm$^{-1}$ (PhO—) are measured by IR.

synthesis of 6-[4-(trans-4-pentylcyclohexyl)phenoxy]hexylacrylate

6-[4-(trans-4-pentylcyclohexyl)phenoxy]hexanol (6.0 g, 17 mmol), triethylamine (2.2 g, 22 mmol) and THF (50 ml) were put into and dissolved in 200 ml three-neck round flask. The solution was cooled into 0° C. by ice. Acryloyl chloride (1.9 g, 21 mmol) was added into the solution using a syringe and was stirred at a room temperature for 12 hours. The obtained white solids were filtered, and the filtered solution was concentrated under a reduced pressure. The obtained residue was dissolved in ethylacetate and was washed three times by water. Anhydrous magnesium sulfate was added into the organic phase solution to remove moisture and was concentrated under a reduced pressure. The residue was refined by a column chromatography with silica-gel and hexane/chloroform (volumetric ratio=50:1) such that non-colored transparent liquid compound was obtained. (6.4 g, yield: 93%) The absorption properties in 2920 cm$^{-1}$ (C—H), 1716 cm$^{-1}$ (C=O) and 1245 cm$^{-1}$ (PhO—) are measured by IR.

<Synthesis of Dendrimer B>

DAB-Am-8 (0.16 g, 0.21 mmol), 6-[4-(trans-4-pentylcyclohexyl)phenoxy]hexylacrylate (4.0 g, 10 mmol) and THF (50 ml) were put into 20 ml branch-flask and were heated at 50° C. for 72 hours. After the solution was concentrated under a reduced pressure, the residue was dissolved in some quantity chloroform and was added to methanol (100 ml). An upper clear portion was removed by decantation, and the precipitate material was obtained. The resultant was refined by repeating twice the above processes such that lemon yellow-color solid compound of paste state was obtained. (0.45 g, yield: 30%) The absorption properties in 2921 cm$^{-1}$ (C—H), 1736 cm$^{-1}$ (C=O) and 1247 cm$^{-1}$ (PhO—) are measured by IR. The elementary analysis of the lemon-yellow color solid compound is $C_{456}H_{736}N_{14}O_{48}$. It is almost equal to simulation result. (margin of error: 5%, simulation result—C:76.25%, H:10.33%, N:2.73%, analysis result—C:76.09%, H:10.52%, N:2.80%) The measured molecular weight of the lemon-yellow color solid compound by MALDI-TOF-MS is closer to the simulation value "m/Z=7181.2 (M+H)" than the theoretical value "m/Z=7183 (M+H). In the DSC results of the lemon-yellow color solid compound, during heat-rising, the glass temperature (Tg) is observed at −24° C., and the endothermic peaks are observed at 14° C. and 73° C. During heat-falling, the exothermic peaks are observed at 69° C. and 15° C., and Tg is observed at −26° C.

EXAMPLE

The dendrimer A and ZLI-4972 (p-type, Merk Co. Ltd) as the fluorine liquid crystal mixture are put into the vial and are mixed to form a liquid crystal composition. The dendrimer A has a weight % of 1 with respect to the liquid crystal composition.

The temperature of the liquid crystal composition is kept on 110° C., and it is visually observed that the dendrimer A is completely dissolved in the fluorine liquid crystal mixture. In addition, after the liquid crystal composition is cooled into the room temperature, there is no phase separation or precipitation of the dendrimer A.

The liquid crystal cell without the orientation layer is fabricated using the liquid crystal composition as follows.

The comb-shaped electrodes of chrome (EHC Co. Ltd product, a distance between electrodes is 10 μm, and an area of each electrode is 2 cm$^2$) and a column spacer using a material (JSR Co. Ltd product, model number is JNPC-123-V2, and a height of the column spacer is about 5 μm) are formed on a first glass substrate by patterning process using a photolithography method. The first glass substrate is cleaned. Next, a thermal curing type sealing material (Mitsubishi-Chemical Co. Ltd product, model number is XN21-S) is coated at edges except an injection hole of the first glass substrate, and a second glass substrate, which is cleaned, is disposed over the first glass substrate. The first and second glass substrates are pressed using a spring type jig and heated at 160° C. for 5 hours such that two substrates are attached. Next, the liquid crystal composition is injected through the injection hole by a capillary method, and the injection hole is sealed by the UV adhesive (Threebond Co. Ltd product, model number is 3027D). A cell gap of the liquid crystal cell is about 5.2 μm.

When the polarizer is rotated in the crossed nicols condition with a polarizing microscope, the liquid crystal cell has the black state. Namely, in the liquid crystal cell, it is observed that the liquid crystal molecule is vertically oriented with respect to the first and second glass substrates.

Next, the non-polarized UV ray is irradiated to the liquid crystal cell using the UV irradiator (Panasonic Co. Ltd product, LED-SPOT type UV irradiator Aicure UJ30) with a distance to the second glass substrate of 3 cm, an incident angle of 30 degrees, an irradiation time of 30 to 60 second, a peak intensity of 1290 mW/cm 2 and a wavelength of 369 nm.

After irradiation of the UV ray, as the polarizer is rotated in the crossed nicols condition with a polarizing microscope, the liquid crystal cell is observed. The black and white states are observed in each 45 degrees. Namely, in the liquid crystal cell after irradiation of the UV ray, the liquid crystal molecule is horizontally oriented with respect to the first and second glass substrates.

<Comparison>

The liquid crystal composition is prepared by the same method of the above Embodiment using the dendrimer B instead of the dendrimer A.

The temperature of the liquid crystal composition is kept on 110° C., and it is visually observed that the dendrimer B is completely dissolved in the fluorine liquid crystal mixture. In addition, after the liquid crystal composition is cooled into the room temperature, there is no phase separation or precipitation of the dendrimer B.

Next, the liquid crystal cell is prepared using the same method of the above embodiment(s).

When the polarizer is rotated in the crossed nicols condition with a polarizing microscope, the liquid crystal cell has the black state. Namely, in the liquid crystal cell, it is observed that the liquid crystal molecule is vertically oriented with respect to the first and second glass substrates.

Next, the polarized UV ray is irradiated to the liquid crystal cell using the same method of the above Embodiment. After irradiation of the UV ray, as the polarizer is rotated in the crossed nicols condition with a polarizing microscope, the liquid crystal cell has a black state in any rotation angle. Namely, in the liquid crystal cell after irradiation of the UV ray, the vertical orientation state of the liquid crystal molecule is maintained.

In the present invention, the liquid crystal horizontal orientation agent being capable of arranging the liquid crystal molecule in a horizontal direction with respect to the substrate without the rubbed orientation layer is provided. In addition, the horizontal orientation type liquid crystal composition, the horizontal orientation type LCD device and the method of fabricating the horizontal orientation type LCD device are provided.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a first substrate including comb-shaped electrodes;
a second substrate facing the first substrate; and
a liquid crystal layer including a liquid crystal component and a liquid crystal horizontal orientation agent, the liquid crystal horizontal orientation agent including a core; and a dendrimer including a dendron part linked with the core,
wherein a liquid crystal molecule in the liquid crystal layer is horizontally oriented with respect to the first and second substrates by a polarized UV ray with and without an electric field between the comb-shaped electrodes,
wherein the core has a first formula of:

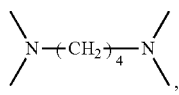

and the dendron part has a second formula of:

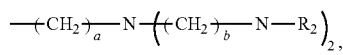

wherein each of "a" and "b" is an integer of 2 to 5, and R has a third formula of:

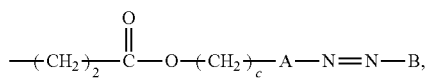

wherein "c" is an integer of 3 to 12, and "A" is one of:

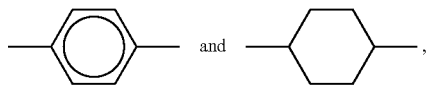

wherein "B" is one of:

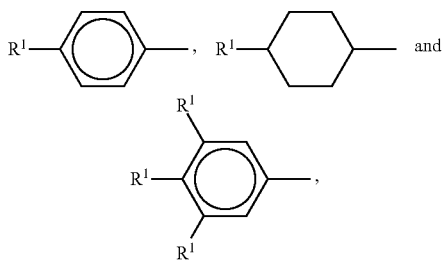

and "R1" is selected from C1 to C12 alkyl, C1 to C12 alkoxy and fluorine.

2. The liquid crystal display device according to claim 1, wherein the dendron part includes at least one compound selected from a group consisting of alkyl, alkoxy and fluorine at an end of the dendron part.

3. The liquid crystal display device according to claim 1, wherein the liquid crystal layer is directly adjacent to the comb-shaped electrodes.

4. A method of fabricating the liquid crystal display device according to claim 1, comprising:
forming comb-shaped electrodes on a first substrate;
attaching a second substrate with the first substrate;
forming a liquid crystal layer including a liquid crystal component and a liquid crystal horizontal orientation agent, the liquid crystal horizontal orientation agent including a core, and a dendrimer including a dendron part linked with the core; and
irradiating a polarized UV ray to the liquid crystal layer.

5. The method according to claim 4, wherein the dendron part includes at least one compound selected from a group consisting of alkyl, alkoxy and fluorine at an end of the dendron part.

6. The method according to claim 4, wherein the liquid crystal layer is directly adjacent to the comb-shaped electrodes.

* * * * *